United States Patent
Tamura (10) Patent No.: US 9,724,728 B2
(45) Date of Patent: *Aug. 8, 2017

(54) ELECTROSTATIC COATING METHOD

(71) Applicant: TAIKISHA LTD, Tokyo (JP)

(72) Inventor: Yoshinobu Tamura, Sagamihara (JP)

(73) Assignee: TAIKISHA LTD., Tokyo (JP)

( * ) Notice: Subject to any disclaimer, the term of this patent is extended or adjusted under 35 U.S.C. 154(b) by 232 days.

This patent is subject to a terminal disclaimer.

(21) Appl. No.: 14/361,511

(22) PCT Filed: Nov. 29, 2012

(86) PCT No.: PCT/JP2012/080821
§ 371 (c)(1),
(2) Date: May 29, 2014

(87) PCT Pub. No.: WO2013/081029
PCT Pub. Date: Jun. 6, 2013

(65) Prior Publication Data
US 2014/0335284 A1 Nov. 13, 2014

(30) Foreign Application Priority Data
Nov. 30, 2011 (JP) .................. 2011-261794

(51) Int. Cl.
*B05D 1/04* (2006.01)
*B05D 3/00* (2006.01)
(Continued)

(52) U.S. Cl.
CPC ............... *B05D 3/005* (2013.01); *B05B 5/03* (2013.01); *B05B 5/0535* (2013.01); *B05D 1/045* (2013.01); *B05D 7/52* (2013.01); *Y02P 60/214* (2015.11)

(58) Field of Classification Search
CPC .. B05D 3/005; B05D 7/52; B05B 5/00; B05B 5/025; B05B 5/03; B05B 5/032
See application file for complete search history.

(56) References Cited

U.S. PATENT DOCUMENTS

| | | |
|---|---|---|
| 3,236,679 A | 2/1966 | Spiller et al. |
| 3,998,716 A | 12/1976 | Masar et al. |

(Continued)

FOREIGN PATENT DOCUMENTS

| | | |
|---|---|---|
| CN | 1162935 A | 10/1997 |
| EP | 2 578 321 | 4/2013 |

(Continued)

OTHER PUBLICATIONS

Communication dated Apr. 3, 2015 from the Japanese Patent Office in counterpart application No. 2011-261794.

(Continued)

*Primary Examiner* — Xiao Zhao
(74) *Attorney, Agent, or Firm* — Sughrue Mion, PLLC; Richard C. Turner (57) ABSTRACT

In a first coating step, low electrical conductivity is imparted to a coating surface 21 of a non-electrically conductive coating object 20 and a first paint film is formed by applying a charged first paint to the coating surface 21 with free ions being suppressed. In a second coating step, a second paint film is formed by applying a negatively-charged second paint to a surface of the first paint film with free ions being suppressed, before the first paint film dries.

7 Claims, 10 Drawing Sheets

(51) Int. Cl.
      *B05B 5/03*         (2006.01)
      *B05B 5/053*      (2006.01)
      *B05D 7/00*        (2006.01)

(56) References Cited

U.S. PATENT DOCUMENTS

| | | | |
|---|---|---|---|
| 5,585,426 A * | 12/1996 | Williams | B05B 5/087 |
| | | | 427/475 |
| 5,720,436 A * | 2/1998 | Buschor | B05B 5/0535 |
| | | | 239/600 |
| 5,928,731 A | 7/1999 | Yanagida et al. | |
| 8,962,095 B2 * | 2/2015 | Tamura | B05B 5/032 |
| | | | 427/470 |
| 2004/0086658 A1 | 5/2004 | Onoyama et al. | |

FOREIGN PATENT DOCUMENTS

| | | |
|---|---|---|
| JP | 09-192586 A | 7/1997 |
| JP | 11-019538 A | 1/1999 |
| JP | 2005-000905 A | 1/2005 |
| JP | 2005-169353 | 6/2005 |
| JP | 2007-38081 | 2/2007 |
| JP | 2007-038081 A | 2/2007 |

OTHER PUBLICATIONS

Chinese Office Action; issued Dec. 2, 2014; Patent Application No. 2012800591015.

Communication dated May 30, 2016 from the European Patent Office in Counterpart Application No. EP 12 85 3906.

\* cited by examiner

TABLE 1: RESULTS OF EFFECT CONFIRMATION EXPERIMENT 1

| PAINT (VOLUME RESISTIVITY VALUE) | HIGH VOLTAGE APPLICATION (ELECTROSTATIC COATING METHOD) | EFFECT CONFIRMATION EVALUATION RESULT | APPLIED HIGH VOLTAGE | | | |
|---|---|---|---|---|---|---|
| | | | 0kV | 30kV | 60kV | 90kV |
| CONDUCTIVE (1MΩcm) | DIRECT APPLICATION (SECOND EMBODIMENT) | TRANSFER EFFICIENCY % | 4.7% | 13.0% | 27.0% | 27.8% |
| | | BACK SURFACE COATING STATE | × MIST PATTERN | △ THIN COATING | ○ EXCELLENT | ○ EXCELLENT |
| | | COATING CURRENT VALUE | 0μA | 3μA | 11μA | 26μA |
| | DIRECT APPLICATION | TRANSFER EFFICIENCY % | 4.7% | 3.8% | 4.0% | 9.6% |
| | | BACK SURFACE COATING STATE | × MIST PATTERN | × MIST PATTERN | × MIST PATTERN | × MIST PATTERN |
| | | COATING CURRENT VALUE | 0μA | 0μA | 1μA | 7μA |
| NORMAL (200MΩcm) | CORONA DISCHARGE + FREE ION REMOVING ELECTRODE (FIRST EMBODIMENT) | TRANSFER EFFICIENCY % | — | — | 23.7% | — |
| | | BACK SURFACE COATING STATE | — | — | ○ EXCELLENT | — |
| | | COATING CURRENT VALUE | — | — | 105μA | — |
| | CORONA DISCHARGE ONLY (NO SUPPRESSION OF FREE IONS) | TRANSFER EFFICIENCY % | — | — | 27.0% | — |
| | | BACK SURFACE COATING STATE | — | — | △ THIN COATING | — |
| | | COATING CURRENT VALUE | — | — | 18μA | — |

Fig. 13

ELECTROSTATIC COATING METHOD

CROSS REFERENCE TO RELATED APPLICATIONS

This application is a National Stage of International Application No. PCT/JP2012/080821 filed Nov. 29, 2012, claiming priority based on Japanese Patent Application No. 2011-261794 filed Nov. 30, 2011, the contents of all of which are incorporated herein by reference in their entirety.

TECHNICAL FIELD

The present invention relates to an electrostatic coating method.

BACKGROUND ART

Generally, electrostatic coating is a coating method in which: an electrostatic field (lines of electric force) is formed by applying a high voltage between a coating object and an electrode on a coating device side with the coating object being an earth electrode and the electrode on the coating device side being an cathode; paint particles are negatively charged; and the paint is thus made to efficiently adhere to the coating object by electrostatic force. Effects such as an improvement in coating efficiency (reduction of a coating time due to an improvement in coating throwing power) and an improvement in transfer efficiency (reduction of a paint usage amount due to an improvement in ratio of amount of paint adhering to a coating object) can be obtained from the electrostatic coating.

Moreover, since the coating object in the electrostatic coating is an electrode, the coating object needs to be electrically conductive. In a case of performing the electrostatic coating on a non-electrically conductive object, the following techniques are used.

Electrical conductivity is imparted to a raw material by mixing an electrically-conductive material or an electrically-conductive agent.

Electrical conductivity is imparted to the coating surface by applying an electrically-conductive film such as a conductive primer.

Low electrical conductivity is temporarily imparted to the coating surface by performing antistatic treatment such as application of surfactant.

Low electrical conductivity is imparted to the coating surface by grounding the coating surface and using an electrically-conductive paint.

An electrostatic capacitance is increased by applying an electrically-conductive material to a back surface of the coating object or bringing the electrically-conductive material close to the back surface of the coating object (potential fall with respect to a charge amount).

Imparting electrical conductivity to the coating surface by applying an electrically-conductive film such as a conductive primer is most commonly employed particularly in a technique of performing electrostatic coating on a surface of a polypropylene (PP) material of a front bumper, a rear bumper, and the like which accounts for the most of coating on resin parts of an automobile.

PRIOR ART DOCUMENTS

Patent Documents

Patent Document 1: Japanese Patent Application Publication No. 2005-169353

Patent Document 2: Japanese Patent Application Publication No. 2007-38081

Patent Document 3: Japanese Patent Application Publication No.

SUMMARY OF THE INVENTION

Problems to be Solved by the Invention

In the case of imparting electrical conductivity by mixing an electrically-conductive material and the like, the performance of a final product may deteriorate due to the mixed electrically-conductive material and the like. Moreover, the mixing of the electrically-conductive material and the like increases the cost.

In the case of imparting electrical conductivity by applying an electrically-conductive film, a step of applying the electrically-conductive film is necessary as a step prior to the electrostatic coating. This increases the number of steps and the cost.

In the case of imparting low electrical conductivity by performing antistatic treatment such as application of a surfactant, the surfactant needs to be thoroughly and uniformly applied to the coating surface. Moreover, since antistatic effects are obtained by development of a water molecule film formed by moisture in the air being adsorbed to a surfactant coating on the coating surface, management of fixed relative humidity exceeding 60% is generally required. If the humidity management is insufficient, variation in transfer efficiency and uneven coating occurs and the coating quality deteriorates. Hence, as in the case of applying an electrically-conductive film, the step of applying the surfactant is required as a step prior to the electrostatic coating and this increases the number of steps and the cost. Particularly, for a coating object having a complex shape such as a radiator grill of an automobile, a suitable facility and management is necessary and the cost greatly increases.

Meanwhile, in the case of imparting low electrical conductivity by grounding the coating surface and using an electrically-conductive paint, the electrically-conductive paint is applied and spread from a position near a grounded portion of the coating surface. Accordingly, increases in the number of steps and cost are suppressed. However, in the electrostatic coating, an energized state of the grounded portion (for example, a metal portion of a jig holding the coating object) and a contact state between the grounded portion and the coating object need to be continuously maintained. Hence, detailed maintenance such as frequent removal of dirt from the grounded portion needs to be performed and work is cumbersome. Moreover, since low electrical conductivity is imparted to the coating surface by applying the electrically-conductive paint, in an initial stage of the coating, the coating is performed on the coating surface to which no low electrical conductivity is imparted, and effects of electrostatic coating such as an improvement in throwing power and an improvement in transfer efficiency cannot be obtained.

Moreover, in the method of increasing the electrostatic capacitance by applying an electrically-conductive material to a back surface of the coating object or bringing the electrically-conductive material close to the back surface of the coating object, a step of applying the electrically-conductive material to the back surface of the coating object and materials for the application need to be added and a special jig used to bring the electrically-conductive material close to the back surface of the coating object needs to be introduced, thereby increasing the cost. Moreover, the charge amount increases along with an increase in the electrostatic capacitance and a risk of discharge spark increases.

The present invention has been made in view of the circumstances described above and an object thereof is to provide an electrostatic coating method which allows excellent electrostatic coating to be continuously performed while suppressing an increase in the number of steps and an increase in the cost, without causing work to become cumbersome.

Means for Solving the Problem

To achieve the object described above, an electrostatic coating method of a first aspect of the present invention includes: a first coating step of forming a first coating film by applying a first paint having electrical conductivity to a coating surface; and a second coating step of forming a second coating film by applying a negatively-charged second paint to a surface of the first coating film with free ions being suppressed, before the first coating film dries. It is only necessary that the first coating step is a step of applying the first paint having conductivity to the coating surface, and any coating method can be employed.

The second coating step may be performed as follows. The second paint is negatively charged by corona discharge from a discharge electrode and free ions generated by the corona discharge are reduced or removed by a free ion removing electrode disposed near the discharge electrode.

Moreover, in the second coating step, generation of free ions may be suppressed by using an electrically-conductive paint as the second paint and negatively charging the electrically-conductive paint by directly applying a high voltage thereto from a high voltage electrode. The volume resistivity value of the electrically-conductive paint is preferably equal to or less than 100 MΩcm, more preferably, equal to or less than 20 MΩcm.

Note that free ions are ions not used for charging of the paint in the negative charging of the paint by the corona discharge and mainly exist as an ionized air.

In the aforementioned method, since the surface of the first coating film before drying (in a wet state) has low electrical conductivity, in the second coating step, the electrostatic coating is performed on the surface of the first coating film having low electrical conductivity with free ions being suppressed. The suppression of free ions reduces the amount of ions reaching the surface of the first coating film and suppresses charging of the surface of the first coating film having low electrical conductivity. Accordingly, it is possible to maintain the charging of the surface of the low electrical conductive first coating film at a low level and continuously perform excellent electrostatic coating.

The method of reducing or removing free ions generated by the corona discharge with the free ion removing electrodes is advantageous in that a wide variety of paints can be used.

Meanwhile, the method of suppressing generation of free ions by negatively charging the conductive paint by directly applying a high voltage to the conductive paint requires no corona discharge electrode or free ion removing electrode, and is advantageous in that: the method does not have the problem of paint stain on the free ion removing electrode; the method does not have a risk of spark caused by the corona discharge electrode; and there is an improvement in paint uniformess typified by an improvement in paint throwing power to a recessed portion of the coating object due to absence of lines of electric force between the corona discharge electrode and the coating object.

An electrostatic coating gun used in the second coating step may include a paint supply passage, a high voltage electrode, and an ejection port. The electrically-conductive paint flows through the paint supply passage. The high voltage electrode is provided in the paint supply passage and directly applies a high voltage to the electrically-conductive paint flowing through the paint supply passage to negatively charge the electrically-conductive paint. The ejection port is provided at a front end of or near the paint supply passage and ejects the negatively-charged electrically-conductive paint to the outside. In other words, the electrostatic coating gun includes no discharge electrode configured to perform corona discharge for negatively charging the electrically-conductive paint.

Moreover, the coating surface may have low electrical conductivity or insulating properties. In the first coating step, the negatively-charged first paint may be applied on the coating surface with free ions being suppressed.

In this case, the first paint can be applied in a way similar to the second paint and multiple layers of coating film can be easily applied one on top of another.

Note that, like the second coating step, the first coating step may be performed such that the first paint is negatively charged by the corona discharge from the discharge electrode and free ions generated by the corona discharge is reduced or removed by the free ion removing electrode disposed near the discharge electrode. Moreover, generation of free ions may be suppressed by negatively charging the first paint (electrically-conductive paint) by directly applying a high voltage thereto from the high voltage electrode.

In the case where the coating object is a non-electrically conductive object (the coating surface has insulating properties), low electrical conductivity is preferably imparted to the coating surface in the first coating step. Low electrical conductivity can be imparted to the coating surface through at least one of a method of performing antistatic treatment on the coating surface and a method of grounding the coating surface and using the electrically-conductive paint. The antistatic treatment on the coating surface may be performed by applying an antistatic solution to the coating surface by wiping.

Furthermore, a desired number of coating films can be applied one on top of another by increasing the number of the coating steps, for example, by performing, before the second coating film dries, a third coating step of forming a third coating film by applying a negatively-charged third paint to a surface of the second coating film with free ions being suppressed and by performing, before the third coating film dries, a fourth coating step of forming a fourth coating film by applying a negatively-charged fourth paint to a surface of the third coating film with free ions being suppressed.

Moreover, since there is no need to increase the electrostatic capacitance by applying the electrically-conductive material to the back surface of the coating object or bringing the electrically-conductive material close to the back surface of the coating object, it is possible to suppress the cost increase and reduce the risk of discharge spark.

In an electrostatic coating method of a second aspect of the present invention, a negatively-charged paint is applied to a coating surface having insulating properties with free ions being suppressed.

In the method described above, the paint is applied to the coating surface having the insulating properties from an earthed side. Even in coating of such a coating surface having insulating properties, the electrostatic coating of the coating surface is performed with free ions being suppressed. The suppression of free ions reduces the amount of ions reaching the coating surface and suppresses charging of the coating surface. Accordingly, it is possible to maintain the charging of the coating surface at a low level and continuously perform electrostatic coating.

Effects of the Invention

The present invention allows excellent electrostatic coating to be continuously performed while suppressing an increase in the number of steps and an increase in the cost, without causing work to become cumbersome.

MODES FOR CARRYING OUT THE INVENTION

In an electrostatic coating method of the present invention, multiple paints are sequentially applied on a coating surface having low electrical conductivity with one paint on top of another, and the method includes at least a first coating step and a second coating step.

In the first coating step, a negatively-charged first paint is applied to the coating surface with free ions being suppressed and a first coating film is thereby formed. In the second coating step, before the first coating film dries, a negatively-charged second paint is applied to a surface of the first coating film with free ions being suppressed and a second coating film is thereby formed. Since the surface of the first coating film which has not dried yet has low electrical conductivity, the electrostatic coating of the second paint can be performed like that of the first paint. Multiple coating films can be thus easily applied one on top of another.

The first coating step and the second coating step are both electrostatic coating in which a paint is applied with free ions being suppressed. Accordingly, the first coating step is described as a representative of both steps. For example, the following two mode examples can be given as a spray gun used in the first coating step.

Description of Electrostatic Coating Using Spray Gun of First Mode Example

A first mode example of the spray gun is described below with reference to the drawings. Note that up and down in the following description correspond to up and down directions in FIG. 1 and front and rear correspond to left and right in FIG. 1.

Figure 1:
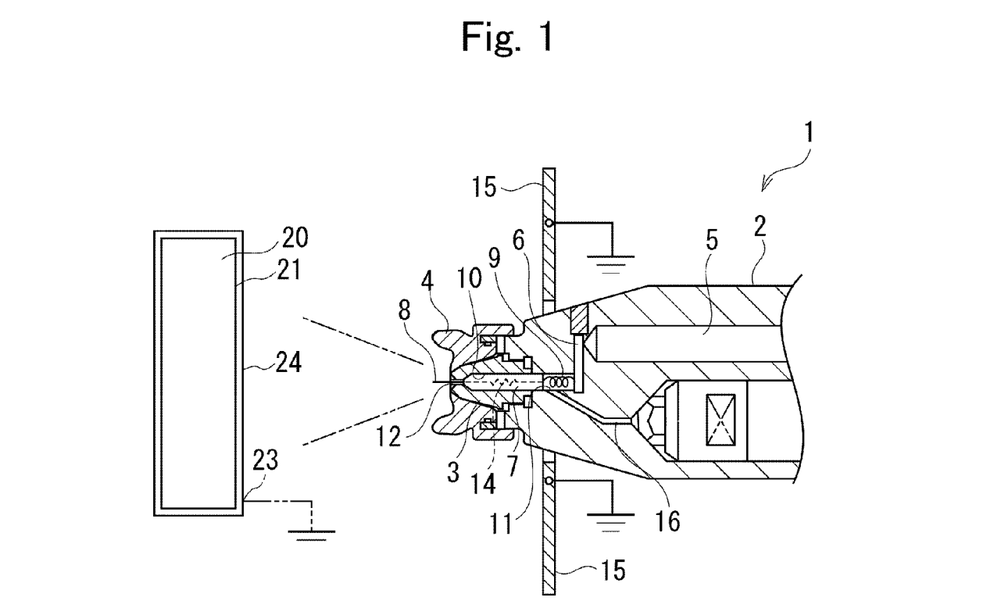
FIG. 1 is a cross-sectional view of an electrostatic coating gun of a first mode example.
Figure 2:
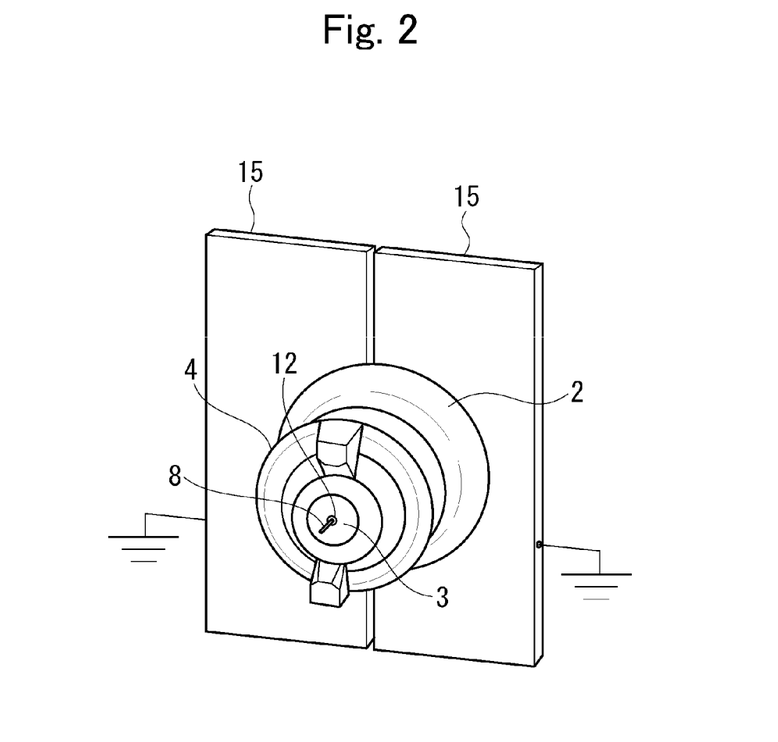
FIG. 2 is an external perspective view of the electrostatic coating gun of FIG. 1.
Figure 3:
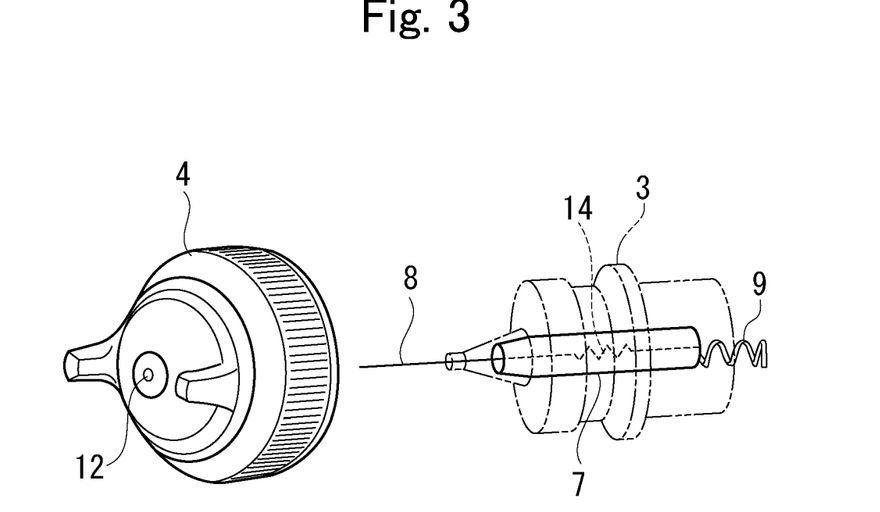
FIG. 3 is an exploded perspective view of the electrostatic coating gun of FIG. 1.

As shown in FIGS. 1 to 3, a spray gun (electrostatic coating gun) 1 of the embodiment is, for example, an automatic spray gun and is used for electrostatic coating of a non-electrically conductive coating object 20. The spray gun 1 includes a gun main body 2 made of an insulating resin, a paint nozzle 3 made of an insulating resin and attached to a distal end portion of the gun main body 2, and an air cap (for example, a type which forms a spray of a circular sector pattern) 4 made of an insulating resin and attached to a front end portion of the gun main body 2 to cover an outer periphery of the paint nozzle 3.

A cascade (high-voltage generating device) 5 molded integrally with a step-up transformer and a high-voltage rectifying circuit which form a high-voltage generating circuit is housed in an upper portion of the gun main body 2. Moreover, a conductive coupling bar 6 is disposed in a front upper portion of the gun main body 2 to extend downward. A front end of the cascade 5 is in contact with the coupling bar 6 and the cascade 5 and the coupling bar 6 are electrically connected to each other.

A hole 10 is formed in a center portion of the paint nozzle 3 and an electrode outer tube 7 made of an insulating resin is housed in the hole 10 to be supported thereby. A rear end portion of the electrode outer tube 7 is inserted into a hole 11 formed in the gun main body 2. A corona pin (for example, a discharge electrode made of tungsten) 8 is housed in a center portion of the electrode outer tube 7 to be supported thereby. A front end of the hole 10 communicates with the outside via an ejection port 12 and a front end of the corona pin 8 is inserted through the ejection port 12 to protrude from a front end of the electrode outer tube 7. The corona pin 8 is connected to a front end side of a protective resistance 14 included in the electrode outer tube 7. A rear end side of the protective resistance 14 is exposed from a rear end of the electrode outer tube 7 and is electrically connected to the coupling bar 6 via a spring 9 housed in the hole 10.

Two types of air jet ports (omitted in the drawings) are provided in the air cap 4. One air jet port functions as an atomized air jet port configured to atomize the ejected paint while the other air jet port functions as a pattern air jet port configured to form a spray of circular sector pattern.

A high-frequency voltage received from a power source connector (not illustrated) is supplied to the step-up transformer in the cascade 5 via a wiring cable (not illustrated) in a grip (not illustrated). The supplied high-frequency voltage is stepped up in the step-up transformer and is then rectified in the high-voltage rectifying circuit while being further stepped up. A direct current high voltage of minus several tens of thousands of volts is thus generated. The generated direct current high voltage is applied to the corona pin 8 by being supplied from the cascade 5 to the coupling bar 6, to the protective resistance 14, and to the spring 9, and generates a large amount of anions through corona discharge (stable air electrical breakdown discharge which occurs due to a non-uniform electric field concentrating at a pin end). The applied high voltage is preferably 60 kV or higher.

A paint flow hole 16 communicating with the hole 11 is formed in the gun main body 2. An electrically-conductive paint is supplied from the paint flow hole 16 to the hole 11, flows through the hole 10, and is ejected from the ejection port 12.

A free ion removing electrode (ground electrode) 15 made of stainless steel and connected to an earth cable is detachably attached to an outer periphery of a front end portion of the gun main body 2. The free ion removing electrode 15 is a plate member which can be divided into two to be attached and detached, and is disposed behind and near the corona pin 8 to extend over a wide area.

A low electrical conductivity is imparted to a coating surface 21 of the non-electrically conductive coating object 20 in advance by antistatic treatment and a grounded portion 23 of the non-electrically conductive coating object 20 is connected to an earth cable to be grounded.

The antistatic treatment is performed by applying an antistatic solution (for example, a solution in which about 0.1% to about 10% of quaternary ammonium salt surfactant is dissolved in isopropyl alcohol) to the coating surface 21 by wiping, and an antistatic treatment coating 24 is formed on the coating surface 21 by the wipe application. The wipe application refers to wiping of the coating surface 21 with a cloth impregnated with the antistatic solution. By the wipe application, the antistatic solution is applied to the coating surface 21 and dust and dirt adhering to the coating surface 21 is wiped off. The wipe application is low quality treatment in which uneven application occurs, and work of the wipe application is extremely easy.

Generally, when application of the antistatic solution to the coating surface 21 of the non-electrically conductive coating object 20 is performed as pretreatment of the electrostatic coating, a uniform continuous coating is formed over the entire coating surface 21 by spray coating or dip coating to prevent deterioration of a coating quality. Meanwhile, in the embodiment, even when low-quality pretreatment such as wipe application is performed, the coating quality does not deteriorate due to an effect obtained by suppressing the free ions to be described later, and the pretreatment can be simplified.

The corona discharge mainly occurs between the corona pin 8 and the free ion removing electrode 15. Paint particles atomized by being ejected from a paint ejection port 29 receive a charge by flying through an area where the discharge is occurring, and are thus negatively charged. The negatively-charged paint particles are attracted toward the coating surface 21 by electrostatic force which is generated between the negative charge of the paint particles and a positive charge emerging on a surface of a grounded object called a mirror effect, and reach the coating surface 21. The charge having reached the coating surface 21 is discharged from the grounded portion 23 due to the low electrical conductivity imparted by the adhering electrically-conductive paint and the antistatic treatment coating 24. Meanwhile, free ions not contributing to the charging of the electrically-conductive paint have very small masses. Therefore, these free ions hardly fly inertially and instead fly toward the free ion removing electrode 15 along lines of electric force to collide with the free ion removing electrode 15, thereby losing the charge. In other words, the free ions are reduced or removed by the free ion removing electrode 15. As described above, the charge carried by the adhering paint particles mainly reach the coating surface 21 and charging of the coating surface 21 caused by contact with an air ionized by the free ions is suppressed.

It is confirmed that the low electrical conductivity imparted by the adhering electrically-conductive paint and the antistatic treatment coating 24 is such that a surface resistance value is about 700 MΩ/□ just after the application of the electrically-conductive paint onto the antistatic treatment coating 24 in a thickness of about 30 μm. This surface resistance value is far higher than that of a metal coating object (the surface resistance value is almost zero Ω/□) and that of a coating object (the surface resistance value is about 10 MΩ/□) to which an electrically-conductive primer is applied. Accordingly, when the electrostatic coating is performed without suppressing free ions, a large amount of charge is supplied to the non-electrically conductive coating object 20 by the free ions and the discharge of the charge from the grounded portion 23 cannot keep up with the supply. The non-electrically conductive coating object 20 is thereby charged to a high level. As a result, electrostatic repulsion is caused by the remaining charge. The electrostatic repulsion causes various electrostatic coating failures such as uneven coating film thickness, a coating throwing power failure, thin coating, deterioration of transfer efficiency, and blowing back of the paint toward a coating machine and a coating worker. Management of preventing such failures is difficult. Particularly, in a case of a large non-electrically conductive coating object having a complex shape such as a radiator grill of an automobile, it is impossible to prevent the occurrence of such failures and, in an actual situation, the electrostatic coating is achieved by mixing electrically-conductive material and the like to impart electrical conductivity or by applying a conductive primer to impart electrical conductivity.

Meanwhile, in the embodiment, the charging of the non-electrically conductive coating object 20 can be maintained at a low level by suppressing free ions. Accordingly, even in the case of a large non-electrically conductive coating object having a complex shape, excellent electrostatic coating can be continuously performed in simple work without the need of cumbersome management and with increases in the number of steps and cost being suppressed.

Moreover, since use of an electrically-conductive paint is unnecessary, the electrostatic coating of the non-electrically conductive coating object 20 can be performed by using a wide variety of paints.

Description of Electrostatic Coating Using Spray Gun of Second Mode Example

Next, a second mode example of the spray gun is described with reference to the drawings. Note that up and down in the following description correspond to up and down directions in FIG. 2 and front and rear correspond to left and right in FIG. 2. Moreover, configurations which are the same as those in the first mode example are denoted by the same reference numerals and description thereof is omitted.

Figure 4:
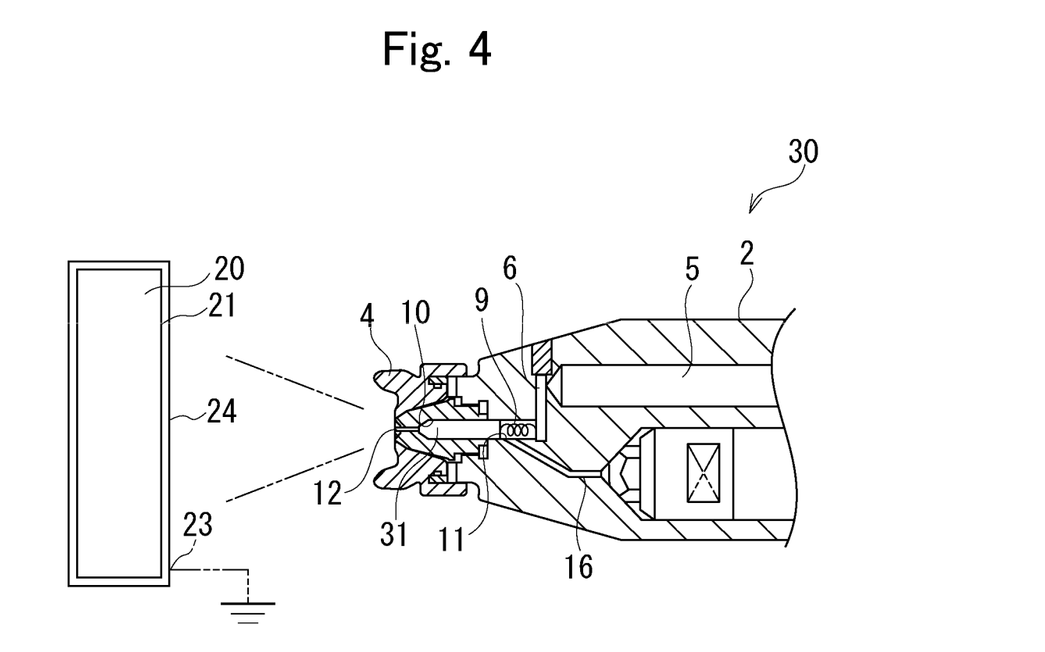
FIG. 4 is a cross-sectional view of an electrostatic coating gun of a second mode example.
Figure 5:
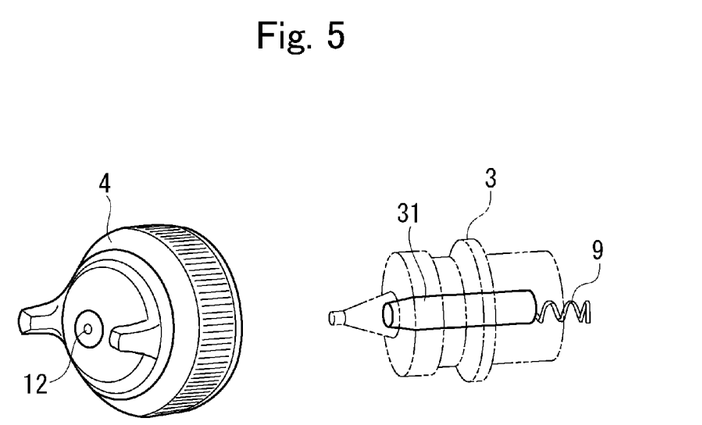
FIG. 5 is an exploded perspective view of the electrostatic coating gun of FIG. 2.

In the mode example, an electrically-conductive paint is used, no corona discharge is performed, and a high voltage is directly applied to the electrically-conductive paint to negatively charge the electrically-conductive paint. Generation of free ions itself is suppressed.

As shown in FIGS. 4 and 5, instead of the electrode outer tube 7 of the first mode example made of the insulating resin, a high voltage direct application electrode (high voltage electrode) 31 made of metal and having an outer shape almost identical to the electrode outer tube 7 is provided in a paint nozzle 3 of a spray gun 30. A rear end of the high voltage direct application electrode 31 is electrically connected to the coupling bar 6 via the spring 9 and, unlike the first mode example, no corona pin 8 is provided.

A direct current high voltage is supplied from the cascade 5 to the high voltage direct application electrode 31 via the coupling bar 6 and the spring 9, and is applied to the electrically-conductive paint flowing through the hole 10 when the electrically-conductive paint comes into direct contact with the high voltage direct application electrode 31. As a result, the electrically-conductive paint itself becomes a discharge electrode and carries the charge. Then the electrically-conductive paint is atomized by being ejected from the ejection port 12 as charged paint particles.

Next, with reference to FIGS. 6 to 10, description is given of the state of the electrically-conductive paint to which a high voltage is applied due to contact with the high voltage direct application electrode 31.

Figure 6:
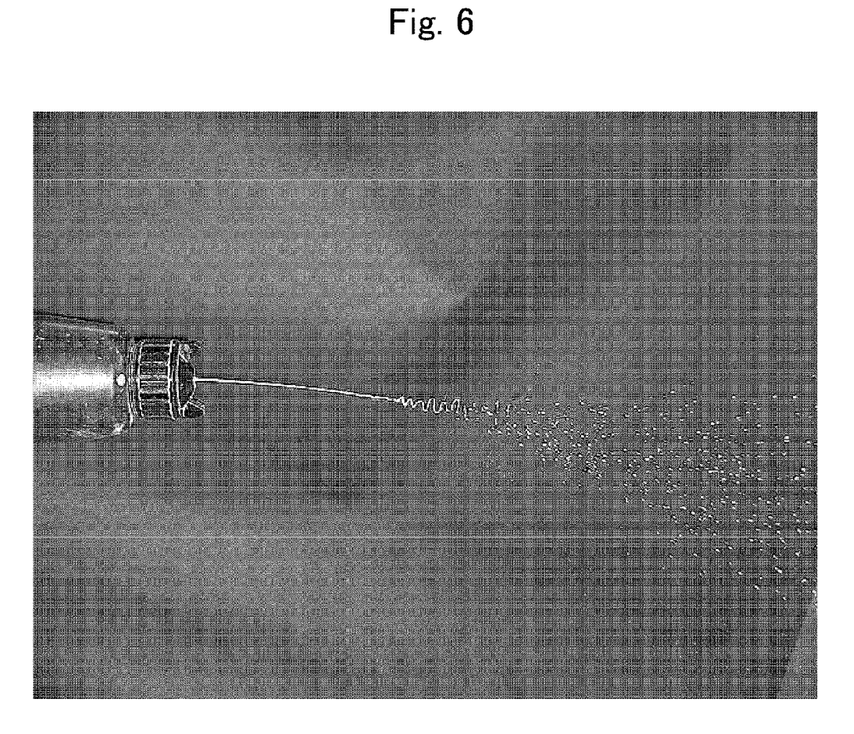
FIG. 6 is a picture capturing a state where a voltage of 60 kilovolts is applied to an electrically-conductive paint whose volume resistivity value is 200 MΩcm and the electrically-conductive paint is ejected as from a water gun with a spray air being stopped.
Figure 7:
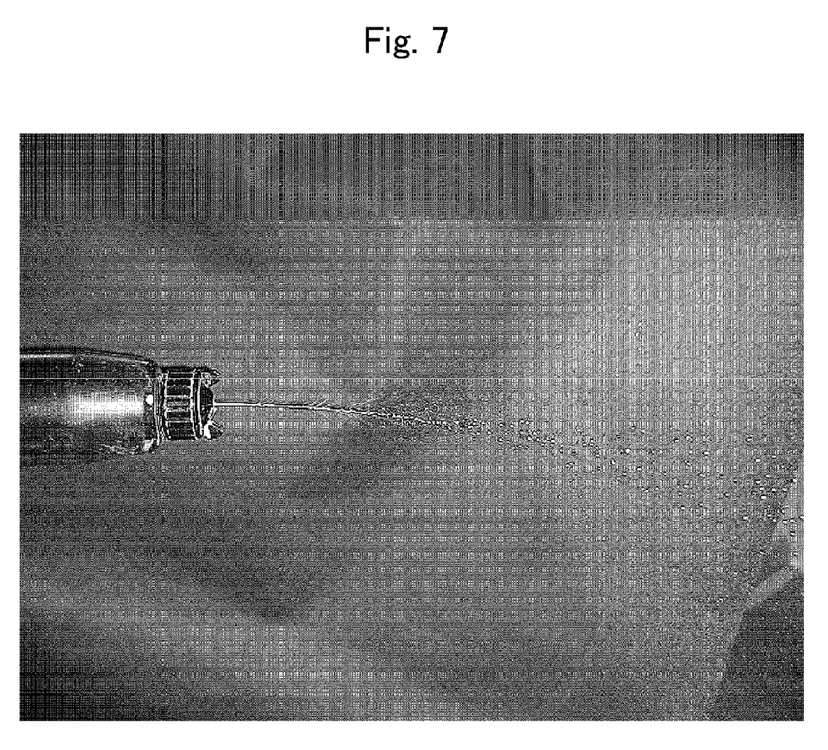
FIG. 7 is a picture capturing a state where a voltage of 60 kilovolts is applied to an electrically-conductive paint whose volume resistivity value is 100 MΩcm and the electrically-conductive paint is ejected as from a water gun with the spray air being stopped.
Figure 8:
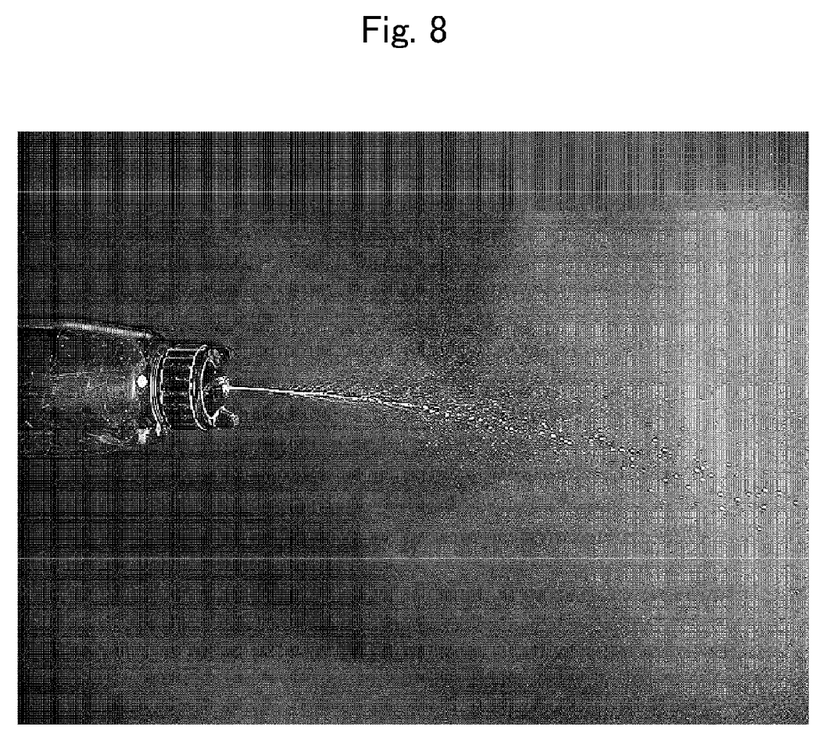
FIG. 8 is a picture capturing a state where a voltage of 60 kilovolts is applied to an electrically-conductive paint whose volume resistivity value is 50 MΩcm and the electrically-conductive paint is ejected as from a water gun with the spray air being stopped.
Figure 9:
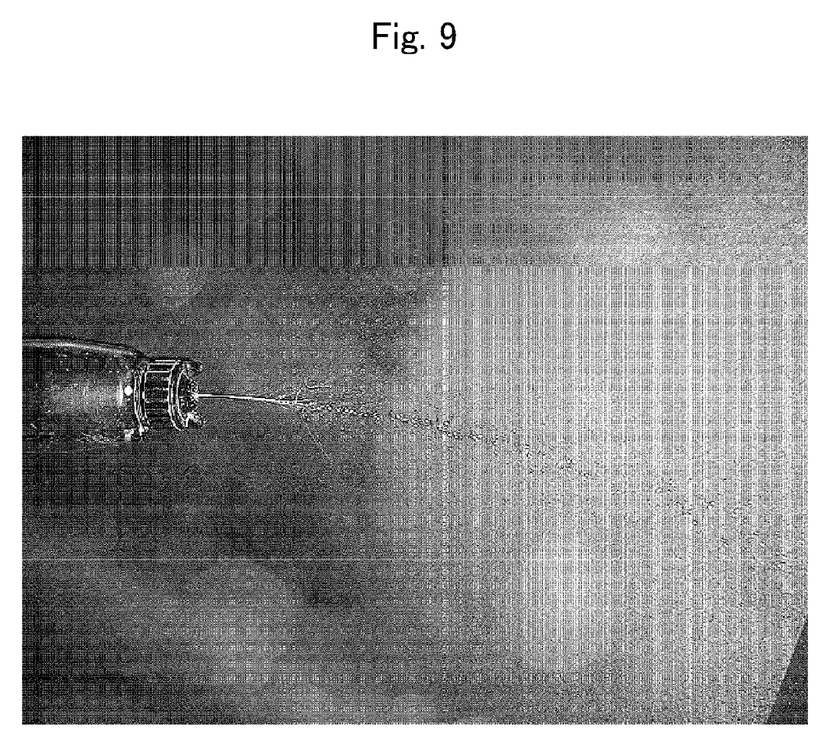
FIG. 9 is a picture capturing a state where a voltage of 60 kilovolts is applied to an electrically-conductive paint whose volume resistivity value is 20 MΩcm and the electrically-conductive paint is ejected as from a water gun with the spray air being stopped.
Figure 10:
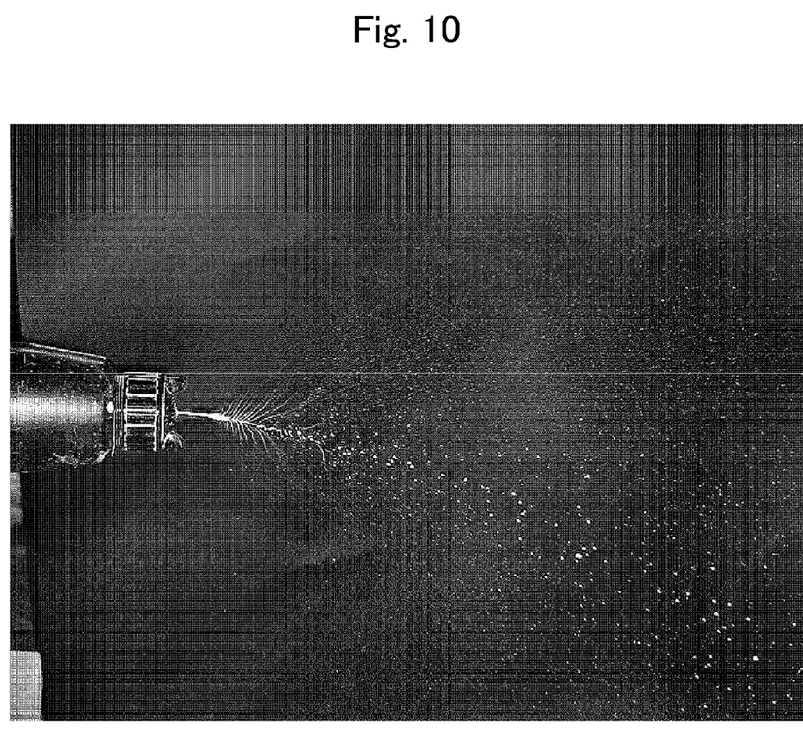
FIG. 10 is a picture capturing a state where a voltage of 60 kilovolts is applied to an electrically-conductive paint whose volume resistivity value is 10 MΩcm and the conductive paint is ejected as from a water gun with the spray air being stopped.

FIGS. 6 to 10 are pictures capturing states where the electrically-conductive paint is ejected from the ejection port 12 as from a water gun with: jetting of air from the air cap 4 which is a paint atomizing portion of the gun main body being completely stopped; applied voltage being fixed to 60 kV; and a volume resistivity value of the electrically-conductive paint being varied. In FIG. 6, the volume resistivity value is set to 200 MΩcm, in FIG. 7, 100 MΩcm, in FIG. 8, 50 MΩcm, in FIG. 9, 20 MΩcm, and in FIG. 10, 10 MΩcm.

As is apparent from these drawings, a paint liquid thread in the case of 200 MΩcm (FIG. 6) is a liquid thread like that of a water gun. Meanwhile, in the paint liquid thread in the case of 100 MΩcm (FIG. 7), it is found that electrostatic repulsion occurs at a position several centimeters away from a point of ejection and the liquid thread is split and atomized into a spine shape. Moreover, it is also found that, as the volume resistivity value of the electrically-conductive paint becomes lower, voltage drop in the paint liquid thread becomes smaller and an effective voltage increases, thereby causing splitting and atomization in a spine shape to occur earlier. In addition, the spine shape becomes more notable.

In the embodiment, a high voltage is directly applied to the electrically-conductive paint to negatively charge the electrically-conductive paint and generation of free ions itself is thereby suppressed. Accordingly, corona discharge is unnecessary and generation of free ions due to the corona discharge itself is suppressed. Hence, charging of the coating surface 21 can be maintained at a lower level.

Moreover, it is possible to maintain the charging of the coating surface 21 to a low level by suppressing generation of free ions due to corona discharge itself and continuously perform excellent electrostatic coating in a simple structure in which the high voltage direct application electrode 31 is provided in the hole (paint supply passage) 10.

Particularly, since generation of free ions due to corona discharge itself is suppressed, the free ion removing electrode for reducing or removing generated free ions is unnecessary and there is no need to clean or wash the free ion removing electrode. Moreover, discharge current can be suppressed to a low level and the capacity of the high voltage generating device can be reduced. Furthermore, unlike the corona pin, the high voltage direct application electrode 31 is not exposed to the outside. Accordingly, generation of sparks is suppressed and the stability is improved.

Note that, since a water soluble paint has high electrical conductivity, it is useable as the paint of the embodiment under the condition that measures to prevent leakage of high voltage from a paint passage are taken.

<Description of Overcoating>

Figure 11:
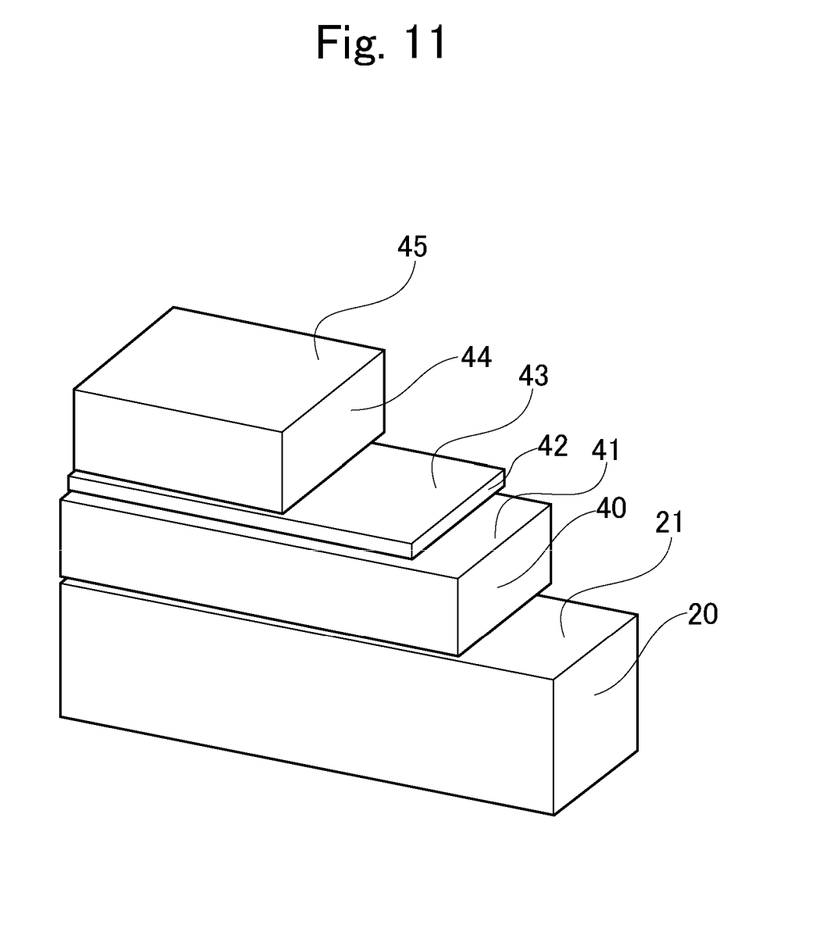
FIG. 11 is a perspective view schematically showing a cross section of coating films applied one on top of another by an electrostatic coating method of the embodiment.

In the embodiment, as shown in FIG. 11, a first coating film 40 is formed by applying the first paint to the coating surface 21 of the non-electrically conductive coating object 20 through the electrostatic coating of the first mode example or the second mode example (first coating step), and then a second coating film 42 is formed by applying the second paint to a surface 41 of the first coating film 40 through similar electrostatic coating (electrostatic coating of the first mode example or the second mode example) (second coating step). The application of the second paint is performed before the first coating film 40 dries. Since the surface 41 of the first coating film 40 before drying has low electrical conductivity, the second paint can be electrostatically applied like the first paint and multiple coating films can be easily applied one on top of another. In other words, overcoating on the coating surface can be easily, surely, and safely performed through excellent electrostatic coating without work becoming cumbersome and with increases in the number of steps and cost being suppressed.

Moreover, before the second coating film 42 dries, a third coating film 44 may be formed by applying a third paint on a surface 43 of the second coating film 42 through similar electrostatic coating (third coating step) and, before the third coating film 44 dries, a fourth coating film (not illustrated) may be formed by applying a fourth paint on a surface 45 of the third coating film 44 (fourth coating step). As described above, a desired number of coating films can be applied one on top another by increasing the number of coating steps.

The overcoating by the electrostatic coating of the embodiment can be applied to, for example, a coating system in which three layers of a PP primer, a base coat, and a clear coat are applied and dried in multiple layers on a PP (polypropylene) resin base material, which is most commonly used for front and rear bumpers of an automobile body, in a wet-on-wet method called 3-coats 1-bake. In this case, the PP resin base material is the non-electrically conductive coating object 20, the first paint is the PP primer, the second paint is the base coat, and the third paint is the clear coat.

Effect Confirmation Experiment 1

Next, an effect confirmation experiment 1 is described.

In the experiment, a 500 cc PET bottle was used as the non-electrically conductive coating object and electrostatic coating was performed by reciprocating an automatic spray gun for electrostatic coating attached to a reciprocator three times in vertical directions and ejecting a paint only within a range of the PET bottle. In this case, the movement of the spray gun was set such that the electrically-conductive paint can be applied and spread from a position near a grounded portion of a coating surface. A high voltage applied to the electrically-conductive paint was set to 0 kV, 30 kV, 60 kV, and 90 kV. The electrically-conductive paint used was a two-pack urethane paint to which a conductive agent was added, and the volume resistivity value thereof was 1 MΩcm. An isopropyl alcohol solution including 0.35% of quaternary ammonium salt was applied onto the surface (coating surface) of the PET bottle by wiping.

Figure 12:
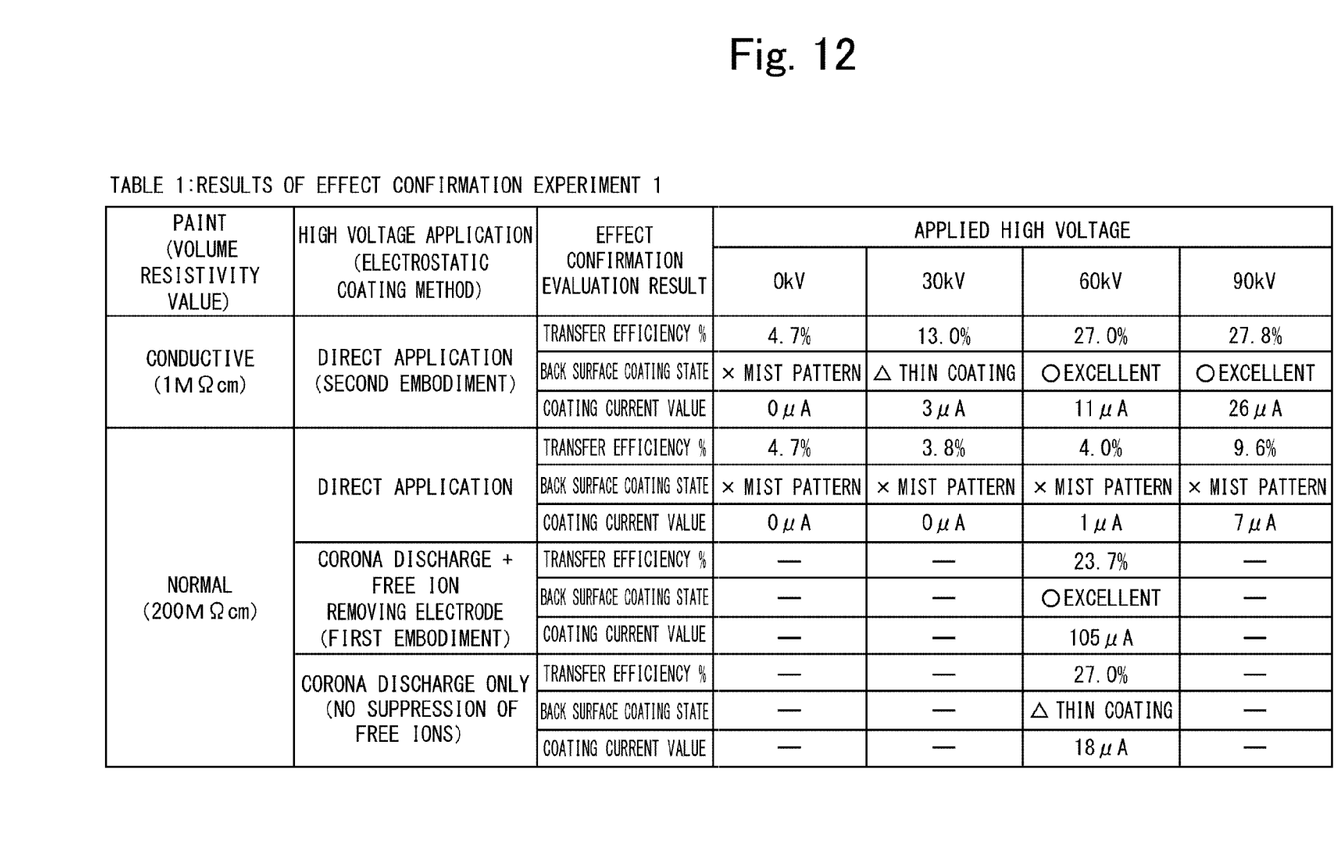
FIG. 12 is a table showing results of an effect confirmation experiment 1.

The results of the effect confirmation experiment 1 are shown in Table 1 of FIG. 12. The following facts are found from these results. Corona discharge+free ion removing electrode in 60 kV corresponds to the first mode example and direct application in 60 kV corresponds to the second mode example.

The transfer efficiency has greatly increased from 4.7% to 23.7% and 27.0% respectively in the first mode example and the second mode example, and it is possible to save the amount of used paint and greatly reduce the paint wasted without adhering.

In both of the first mode example and the second mode example, the throwing power to a back surface (back surface coating state) of the PET bottle is excellent and coating performed with the spray gun facing side surfaces, back surfaces, and the like can be omitted. Accordingly, the coating trajectory of the spray gun can be greatly reduced (the coating time can be reduced).

In the second mode example, a coating current value is far smaller than that in the first mode example and the size (capacity) of the high voltage generating device can be reduced due to reduction of the current.

Effect Confirmation Experiment 2

Next, an effect confirmation experiment 2 is described.

In the experiment, a radiator grill made of an ASA resin was used as the non-electrically conductive coating object and a coating robot including an automatic spray gun performed coating while directly applying a voltage of 0 kV (no voltage application) and performed electrostatic coating while directly applying a voltage of 60 kV (second mode example). Note that other conditions are the same as those in the effect confirmation experiment 1.

As a result of the experiment, it is found that the paint usage amount in the second mode example is reduced by 28% compared to that in the no voltage application and the robot coating time is reduced by 50% from 60 seconds to 30 seconds.

Moreover, it is found that the coating film is uniformly formed on uneven surfaces and side surfaces due to a synergistic effect between an improvement in transfer efficiency and an improvement in throwing power, and uniform application property of the coating can be confirmed.

Effect Confirmation Experiment 3

Next, an effect confirmation experiment 3 is described.

In the experiment, the transfer efficiency was measured with the high voltage applied to the electrically-conductive paint in the effect confirmation experiment 1 being set to 60 kV and with the volume resistivity value of the electrically-conductive paint being varied from 200 MΩcm to 0.5 MΩcm.

Figure 13:
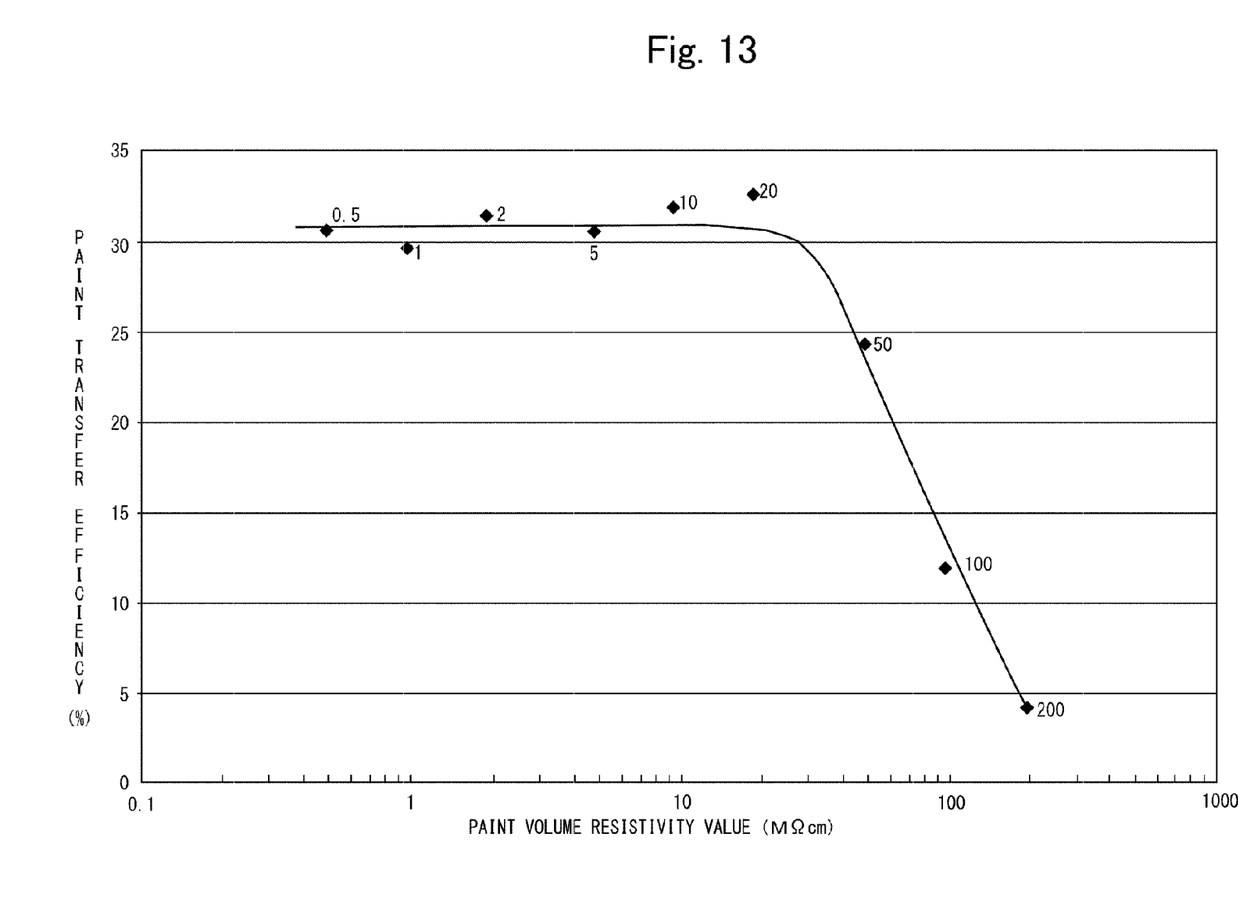
FIG. 13 is a graph showing results of an effect confirmation experiment 3.

The results of the effect confirmation experiment 3 are shown in FIG. 13. It is found from these results that the volume resistivity value of the electrically-conductive paint is preferably equal to or lower than 100 MΩcm, more preferably equal to or lower than 20 MΩcm.

Effect Confirmation Experiment 4

Next, an effect confirmation experiment 4 is described.

In a coating system (3-coat 1-bake coating on a resin base material) in which three layers of a PP primer, a base coat, and a clear coat are applied and dried in multiple layers on a PP resin base material, all of the three layers are applied by non-electrostatic coating in common conventional coating; or a PP primer having high electrical conductivity (surface resistance value: about 10 MΩ/□) is applied by non-electrostatic coating and the base coat (second layer) and the clear coat (third layer) are applied by electrostatic coating of a conventional technique. The electrostatic coating of the conventional technique refers to a coating method in which: an electrostatic field (lines of electric force) is formed by applying a high voltage between a coating object and an electrode on a coating device side with the coating object being an earth electrode and the electrode on the coating device side being a cathode; paint particles are negatively charged; and the paint are made to adhere to the coating object by electrostatic force. The electrostatic coating of the conventional technique is essentially different from the electrostatic coating of the embodiment in that the high voltage is applied between the coating object and the coating device side to actively form the electrostatic field.

Meanwhile, the coating method of the embodiment is a multilayer electrostatic coating method in which electrostatic coating is performed with free ion suppressing means being added, the electrostatic coating being performed on a coating object (having low electrical conductivity where a surface resistance value is about 1 to about 10 GΩ/□) which is coated with the electrically-conductive paint (volume resistivity value: 1 MΩcm) and which has not dried yet and is still wet.

In the experiment, the common conventional coating and the multilayer electrostatic coating of the embodiment were compared for coating of the base coat which was the second layer in the multilayer electrostatic coating (two-layer wet-on-wet multilayer electrostatic coating).

Non-electrostatic coating was employed as the conventional coating. In the non-electrostatic coating, the entire surface of the coating object (having low electrical conductivity and being in a wet state where the PP primer was applied and was still wet) placed on a coating rotation table was coated with a base coat paint (paint volume resistivity value: 1 MΩcm) by non-electrostatic coating in a pattern like a spray pattern by using an electrostatic coating gun (an air spray electrostatic handgun of an electrically-conductive paint direct voltage application type) while turning the coating object with a hand as in a potter's wheel.

Meanwhile, in the multilayer electrostatic coating of the embodiment, the coating object was coated with a base coat paint only from the front side without being rotated, in a spray pattern in which a high voltage of 60 kV was directly applied to the paint in the gun, and the multilayer electrostatic coating of the embodiment was compared with the conventional non-electrostatic coating. Comparison results are as follows.

(1) Non-electrostatic Coating being Comparison Target (High Voltage 0 kV Spray)

Time required to coat the entire surface: 60 seconds (coating of 25 reciprocating strokes with the coating object being rotated)

Paint usage amount required to coat the entire surface: 160 cc.

(2) Electrostatic Coating of the Embodiment (High Voltage 60 kV Spray)

Time required to coat the entire surface: 11 seconds (coating of three reciprocating strokes only from the front side of the coating object)

Paint usage amount required to coat the entire surface: 30 cc

State of the paint throwing power on the entire surface: excellent (3) Consideration of Effect In the electrostatic coating of the embodiment, the coating time and the paint usage amount are both reduced by about 80% compared to the conventional non-electrostatic coating and it is confirmed that the electrostatic coating of the embodiment has a great effect on the reduction of the coating time and the reduction of the paint usage amount. Although the effect on the base coat of the second layer is confirmed in the experiment, the same effect can be also obtained in a case of painting a clear coat of the third layer, fourth and subsequent layers.

Moreover, in the embodiment, since a conductive primer (surface resistance value: about 10 MΩ/□) which is about 30% expensive than a general primer is unnecessary, the unit cost of the paint can be also reduced. Moreover, there is employed a coating method in which the electrostatic coating is performed in a semiconductor state where the surface resistance value is 100 to 1000 times greater than that of the conductive primer and in which only the minimum required charge is given in the free ion suppressed state. Accordingly, a risk of floating conductor charge spark occurring when earthing of the coating object is insufficient is reduced.

In the embodiment described above, description is given of the case where low electrical conductivity is imparted to the coating surface 21 of the non-electrically conductive coating object 20. However, the present invention can be applied to a coating object made of a material with low electrical conductivity. In this case, the electrostatic coating can be performed without regard to the imparting of low electrical conductivity to the coating surface.

Moreover, in the embodiment described above, low electrical conductivity is imparted to the coating surface 21 through a method of performing the antistatic treatment on the coating surface 21 in which the antistatic solution is applied to the coating surface 21, and a method of grounding the coating surface 21 and using the electrically-conductive paint. However, the low electrical conductivity may be imparted to the coating surface 21 by using only one of the two methods or by using another method.

Moreover, in the first mode example, description is given of the case where the air spray type spray gun 1 is used as the electrostatic coating gun. Instead, an airless spray gun configured to perform corona discharge may be used.

Furthermore, in the second mode example, description is given of the case where the airless spray gun 30 is used as the electrostatic coating gun configured to directly apply a high voltage to the electrically-conductive paint and negatively charge the electrically-conductive paint. However, the electrostatic coating gun of the present invention is not limited to this and may be an airless spray gun or a rotational atomization gun having a structure in which an inner structure configured to directly apply a high voltage to the electrically-conductive paint and negatively charge the electrically-conductive paint is insulated from a high voltage application conductive body (a corona electrode pin, a metal bell cup, a metal spray cap, a metal spray nozzle, and the like) generating free ions.

Moreover, in the embodiment described above, description is given of the case where the paint particles are negatively charged with the electrode on the coating device side being the cathode. However, the paint particles may be positively charged with the electrode on the coating device side being an anode.

Furthermore, in the embodiment described above, description is given of the case where similar electrostatic coating is performed in the first coating step and the second coating step, i.e. the case where the negatively-charged first paint is applied on the coating surface 21 with free ions being suppressed. However, it is only necessary that the first coating step is a step in which the electrically-conductive first paint is applied to the coating surface 21, and any coating method may be used. For example, in the first coating step, the first paint may be applied with a non-electrostatic air spray or with a cloth, a brush, or the like.

Moreover, in the embodiment described above, description is given of the case where the electrostatic coating is performed on the coating surface 21 having low electrical conductivity. However, the coating surface may have insulating properties and there may be performed coating of a single layer in which only the first paint is applied by the electrostatic coating of the embodiment described above.

In this case, the coating surface having the insulating properties is earthed and the first paint is sequentially applied from a portion of the coating surface on the earthed (grounded) side. Even in coating of such a coating surface having insulating properties, the electrostatic coating of the coating surface is performed with free ions being suppressed. The suppression of free ions reduces the amount of ions reaching the coating surface and suppresses charging of the coating surface. Accordingly, it is possible to maintain the charging of the coating surface at a low level and continuously perform electrostatic coating.

The embodiment to which the invention made by the inventors is applied has been described above. However, the present invention is not limited by the description and the drawings of the embodiment which form part of the disclosure of the prevent invention. Specifically, it should be added that other embodiments, examples, operation techniques, and the like made by those skilled in the art and the like based on the embodiment are all included in the scope of the present invention as a matter of course.

INDUSTRIAL APPLICABILITY

The present invention can be widely used in electrostatic coating of a non-electrically conductive or low-electrically conductive coating object.

EXPLANATION OF THE REFERENCE NUMERALS

1: Spray gun (electrostatic coating gun)
2: Gun main body
3: Paint nozzle
4: Air cap
5: Cascade (high-voltage generating device)
7: Electrode outer tube
8: Corona pin
10: Hole (paint supply passage)
12: Ejection port
15: Free ion removing electrode (ground electrode)

20: Non-electrically conductive coating object
21: Coating surface
23: Grounded portion
24: Antistatic treatment coating
30: Spray gun (electrostatic coating gun)
31: High voltage direct application electrode
40: First coating film
41: Surface of first coating film
42: Second coating film
43: Surface of second coating film
44: Third coating film
45: Surface of third coating film

The invention claimed is:

1. An electrostatic coating method comprising:
a first coating step of forming a first coating film by applying first liquid paint having electrical conductivity to a coating surface; and
a second coating step of forming a second coating film by applying second liquid paint having electrical conductivity to a surface of the first coating film, before the first coating film dries, wherein
the second coating step comprising:
charging the conductive second liquid paint negatively by contacting the conductive second liquid paint with a high-voltage electrode and receiving direct application of a high voltage from the high-voltage electrode; and
coating the surface of the first coating film with the negatively charged conductive second liquid paint, the negatively charged conductive second liquid paint acting as a discharge electrode suppressing generation of free ions.

2. The electrostatic coating method according to claim 1, wherein
the coating surface has low electrical conductivity or insulating properties, and wherein
the first coating step comprising:
charging the conductive first liquid paint negatively by contacting the conductive first liquid paint with a high-voltage electrode and receiving direct application of a high voltage from the high-voltage electrode; and
coating the coating surface with the negatively charged conductive first liquid paint, the negatively charged conductive first liquid paint acting as a discharge electrode suppressing generation of free ions.

3. The electrostatic coating method according to claim 1, wherein the coating surface has low electrical conductivity or insulating properties, and
in the first coating step, the first paint is negatively charged and is applied on the coating surface with free ions being suppressed.

4. An electrostatic coating method comprising:
a first coating step of forming a first coating film by applying a first paint having electrical conductivity to a coating surface; and
a second coating step of forming a second coating film by applying a negatively-charged second paint to a surface of the first coating film with free ions being suppressed, before the first coating film dries, wherein
the free ions are reduced or removed by a free ion removing electrode disposed near a discharged electrode.

5. The electrostatic coating method according to claim 4, wherein the negatively-charged second paint is formed by applying a high voltage to the second paint.

6. The electrostatic coating method according to claim 5, wherein the high voltage is directly applied to the second paint without performing corona discharge.

7. An electrostatic coating method comprising:
a first coating step of forming a first coating film by applying a first paint having electrical conductivity to a coating surface; and
a second coating step of forming a second coating film by applying a negatively-charged second paint to a surface of the first coating with free ions being suppressed, before the first coating film dries, wherein
the free ions are reduced or removed by a free ion removing electrode disposed near a discharged electrode, and
the free ion removing electrode is a stainless steel plate which is detachably attached to an outer periphery of a corona pin of a corona discharge system and corona discharge mainly occurs between the corona pin and the free ion removing electrode.

* * * * *